United States Patent [19]

Yeh

[11] Patent Number: 5,042,529
[45] Date of Patent: Aug. 27, 1991

[54] STRUCTURE OF WATER FLOW REGULATING DEVICE

[76] Inventor: Wan Tiao Yeh, No.75-1, Lane Kou Chien, Li Kou Chien, Lu Kang Chen, Changhua, Taiwan

[21] Appl. No.: 631,498

[22] Filed: Dec. 21, 1990

[51] Int. Cl.$^5$ .......................... F16K 5/20; F16K 25/00
[52] U.S. Cl. ................................ 137/625.31; 251/161; 251/164; 251/188; 251/208; 251/214; 251/288
[58] Field of Search ...................... 137/625.31, 625.32, 137/801; 251/205, 208, 209, 214, 287, 288, 160, 161, 164, 188

[56] References Cited

U.S. PATENT DOCUMENTS

| | | | |
|---|---|---|---|
| 860,684 | 7/1907 | Montgomery | 137/625.31 |
| 1,479,544 | 1/1924 | Johnson | 251/208 |
| 3,292,898 | 12/1966 | Willman | 251/214 |
| 3,385,321 | 5/1968 | Ehrens et al. | 251/188 |
| 3,807,455 | 4/1974 | Farrell | 137/625.31 |
| 3,831,621 | 8/1974 | Anthony et al. | 137/625.31 |
| 4,331,176 | 5/1982 | Parkison | 137/625.31 |
| 4,651,770 | 3/1987 | Denham et al. | 137/625.31 |
| 4,738,277 | 4/1988 | Thomas | 137/625.31 |
| 4,753,418 | 6/1988 | Brotcke | 251/288 |
| 4,821,765 | 4/1989 | Igbal et al. | 137/625.31 |

Primary Examiner—George L. Walton
Attorney, Agent, or Firm—Bacon & Thomas

[57] ABSTRACT

A water flow regulating device which comprises a casing having a control chamber at the upper middle for holding a regulating valve and a division wall at the lower middle to block up the water outlet from the water inlet thereof. A teflon washer is set inside the control chamber and squeezed by the regulating valve, which has two through-holes disposed in alignment with the two through-holes on the bottom of the control chamber respectively in communication with the water inlet and the water outlet. The regulating valve is secured to the casing by a lock nut and is confined by a control ring to rotate on the teflon washer within a fixed range for controlling the alignment of its two through-holes with the through-holes on the teflon washer and the through-holes on the control chamber so as to regulate water flow rate from the water inlet into the water outlet. A clearance is maintained between the outer projection of a control ring and the bottom edge of the notch on the top edge of the control chamber so that the regulating valve can be further squeezed downward by the lock nut according to the wearing of the teflon washer in service.

1 Claim, 3 Drawing Sheets

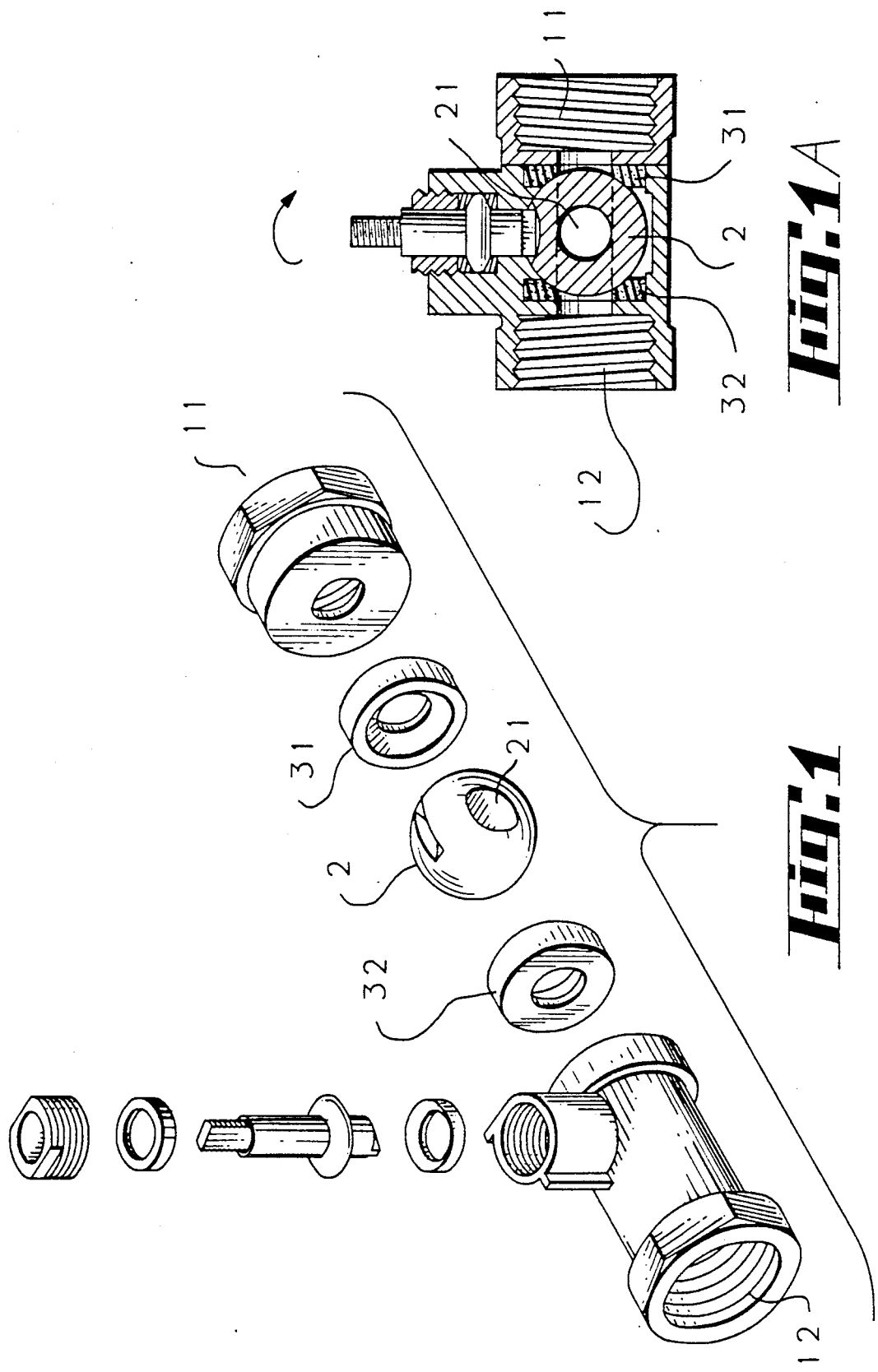

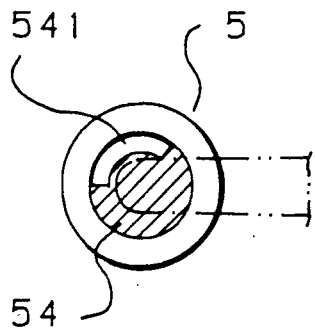
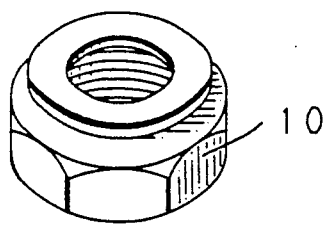
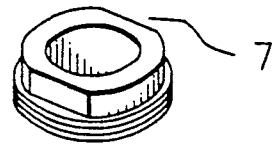
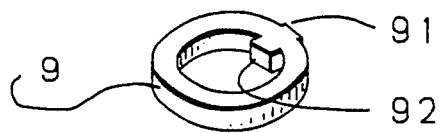
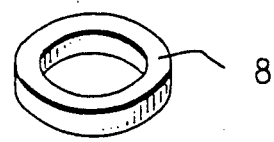
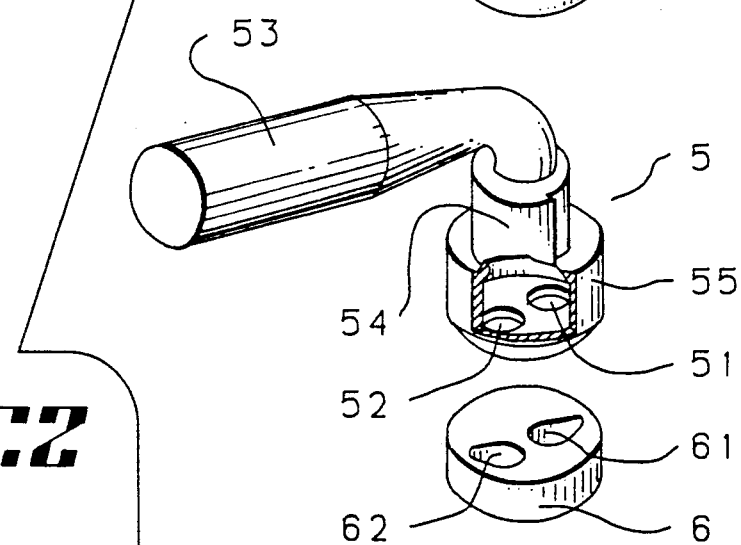
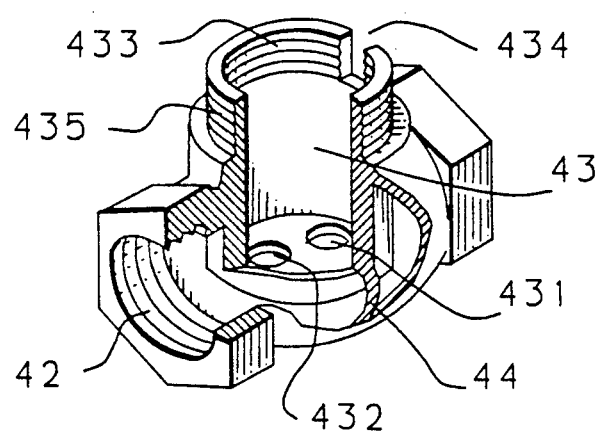

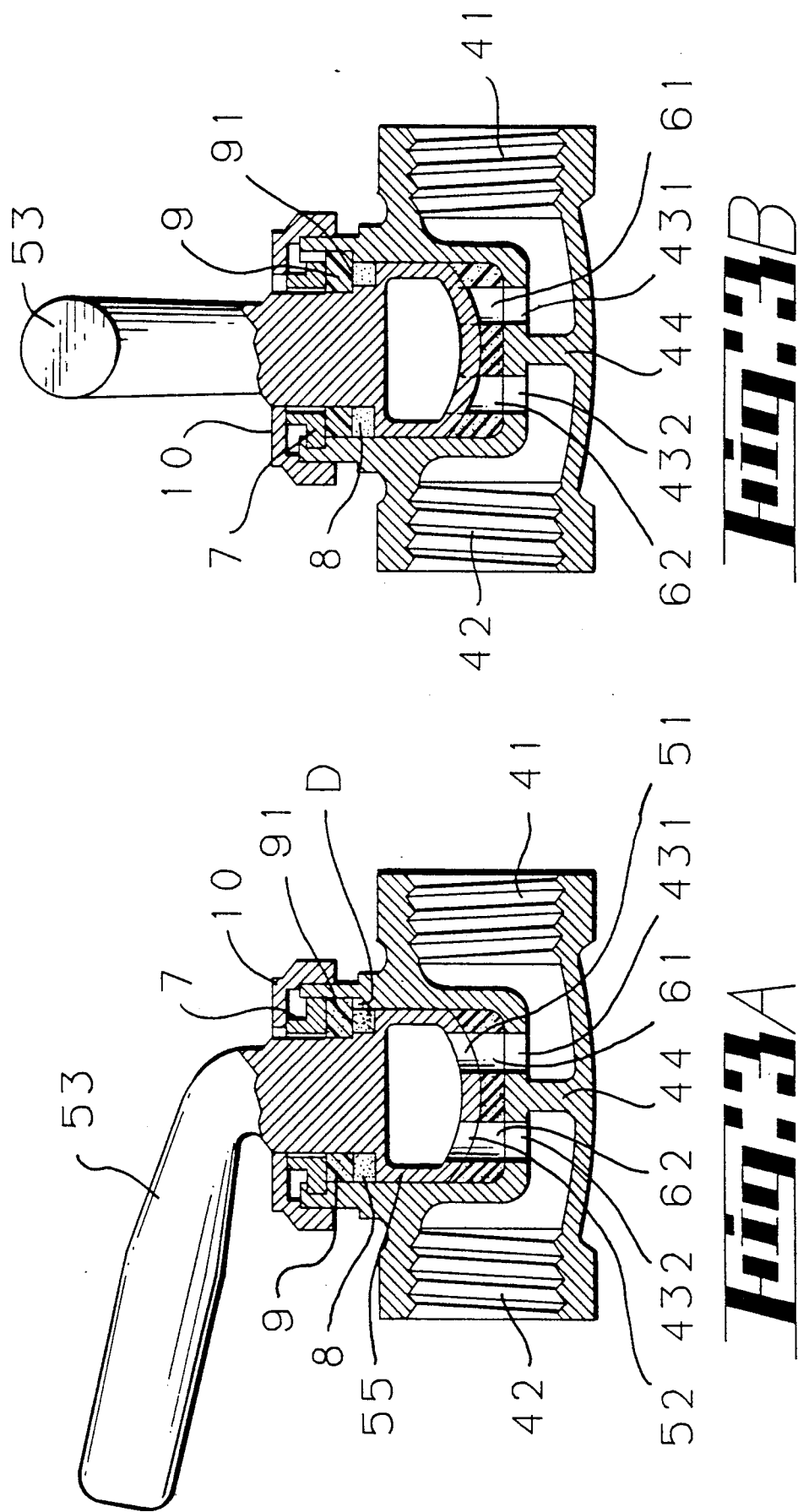

STRUCTURE OF WATER FLOW REGULATING DEVICE

BACKGROUND OF THE INVENTION

1. Field of the Invention

The present invention relates to water flow regulating devices, and more particularly to a water flow regulating device for regulating water flow rate by means of a regulating valve which can be adjusted according to the wearing of a teflon washer so as to extend the service life of the device.

2. Description of the Prior Art

FIGS. 1 and 1A illustrate a ball valve type water flow regulating device of the prior art to which the present invention pertains. As illustrated in the drawings, the device comprises a casing having set therein a ball valve which has a through-hole with its both ends respectively disposed in communication with a water inlet and a water outlet. Two guard rings which are made of teflon material are fastened in the casing to hold the ball valve therebetween. Water flow rate is regulated by means of rotating a control bolt to drive the ball valve to rotate between the two guard rings. Because the guard rings are specially designed for use in this type of device and fixedly fastened in the casing of the device, water leakage problem may happen easily due to wearing of the guard rings through long period friction effect against the ball valve. Once water leakage problem arises, the whole device must be replaced.

SUMMARY OF THE INVENTION

The present invention has been accomplished to eliminate the afore-said problem. According to one aspect of the present invention, a water flow regulating device comprises a casing having a control chamber at the upper middle for holding a regulating valve and a division wall at the lower middle to block up the water outlet from the water inlet thereof. A teflon washer is set inside the control chamber and squeezed by the regulating valve, which has two through-holes disposed in alignment with the two through-holes on the bottom of the control chamber respectively in communication with the water inlet and the water outlet. The regulating valve is secured to the casing by a lock nut and is confined by a control ring to rotate on the teflon washer within a fixed range for controlling the alignment of its two through-holes with the through-holes on the teflon washer and the through-holes on the control chamber so as to regulate water flow rate from the water inlet into the water outlet.

According to another aspect of the present invention, a clearance is maintained between the lock nut and the top edge of the control chamber and another clearance is maintained between the outer projection of a control ring and the bottom edge of a notch which is made on the top edge of the control chamber so that the regulating valve can be further squeezed downward by the lock nut according to the wearing of the teflon washer in service. Once the teflon washer is worn to such an extent that the lock nut can not be screwed downward further, it can be replaced with a new one so that the device can be continuously used further. Therefore, serving life of the device can be greatly extended.

BRIEF DESCRIPTION OF THE DRAWINGS

The foregoing and other objects, features and advantages of the present invention will be best understood from the following description, the appended claims and the accompanying drawings in which:

FIG. 1 is a perspective dismantled view of a water flow regulating device according to the prior art;

FIG. 1A is a sectional structural view of the water flow regulating device of FIG. 1;

FIG. 2 is a perspective dismantled and partly sectional view of a water flow regulating device embodying the present invention;

FIG. 3A is a sectional structural view of the preferred embodiment of the present invention, illustrating an operation to regulate water flow rate; and FIG. 3B is a sectional view of the preferred embodiment of the present invention, illustrating an operation to adjust the position of the regulating valve according to the wearing of the teflon gasket.

DETAILED DESCRIPTION OF THE PREFERRED EMBODIMENT

Referring to FIGS. 2, there is illustrated a water flow regulating device embodying the present invention and generally comprised of a casing 4 screwed up with a lock nut 7 to movably secure a teflon washer 6 and a regulating valve 5 thereto for flow control. The casing 4 comprises a water inlet 41 at one end, a water outlet 42 at an opposite end, a cylindrical control chamber 43 at the upper middle, and a division wall 44 at the lower middle. The division wall 44 is disposed right below the cylindrical control chamber 43 to block the water outlet 42 from the water inlet 41. The cylindrical control chamber 43 has a bottom with two through-holes 431, 432 made thereon at two locations respectively in communication with the water inlet 41 and the water outlet 42, an inner thread 433 for mounting the lock nut 7, and a notch 434 internally at the top edge. The teflon washer 6 which comprises two through-holes 61, 62 at two locations corresponding to the through-holes 431, 432 on the control chamber 43 has a top surface curved inwards and a bottom surface outwards to fit the bottom of the control chamber 43. The regulating valve 5 comprises an unitary hand-hold 53 curvilinearly extending from a hollow cylindrical body 55 which is designed to fit in with the control chamber 43 and has two through-holes 51, 52 on its bottom at two locations corresponding to the two through-holes 61, 62 of the teflon washer 6 and the two through-holes 431, 432 of the control chamber 43 so that water can be controlled to flow from the water inlet 41 through the through-holes 51, 52, 61, 62, 431, 432, for discharging through the water outlet 42. There is a raised portion 54 made on the regulating valve 5 between the hollow cylindrical body 55 and the hand-hold 53, which has a sector notch 541 made at its periphery (see FIG. 2B). Before the lock nut 7 is screwed up with the inner thread 433 of the control chamber 43 to secure the regulating valve 5 to the casing 4, a rubber ring 8 and a control ring 9 are respectively mounted on the raised portion 54 of the regulating valve 5. The rubber ring 8 is to protect from water leakage through the gap between the regulating valve 5 and the casing 4. The control ring 9 has an outer projection 91 and an inner projection 92. After assembly of the device, the outer projection 91 of the control ring 9 is secured in the notch 434 of the control chamber 43 and the inner projection 92 is inserted in the sector notch 541 of the raised portion 54 of the regulating valve 5 to confine the rotation of the regulating valve 5 within a limited range. Furthermore, the casing 4 provides a outer thread 435 in its top, and a nut 10 is screwed up with the said outer thread 435 for covering all elements.

Referring to FIG. 3A, when the regulating valve 5 is turned, through the hand-hole 53, to a position permitting the through-holes 51 and 52 of the hollow cylindrical body 55 to respectively align with the through-holes 61 and 62 of the teflon washer 6 and the through-holes 431 and 432 of the control chamber 43 of the casing 4, water from water inlet 41 is stopped by the division wall 44 to flow through through-holes 431, 61 and 51 into the inner space of the hollow cylindrical body 55 of the regulating valve 5 and then to flow through the through-holes 52, 62 and 432 for further discharging through the water outlet 42. When the regulating valve 5 is rotated to a position with the through-holes 51 and 52 moved away from through-holes 61 and 62 of the teflon washer 6 and the through-holes 431 and 432 of the control chamber 43 (see FIG. 3B), water from the water inlet 41 is stopped from entering the hollow cylindrical body 55 of the regulating valve 5, and no water is permitted to discharge through the water outlet 42. During operation in rotating the hand-hold 53, the overlapped area of the through-holes 51 and 52 of the regulating valve 5 with the through-holes 61 and 62 of the teflon washer 6 and the through-holes 431 a..d 432 of the casing 4 is regulated from zero to maximum or from maximum to zero so that flow rate of water is controlled accordingly.

After assembly of the device, a suitable clearance is maintained between the outer projection 91 of the control ring 9 and the bottom edge of the notch 434 of the control chamber 43. Because of the clearance D, the lock nut 7 is permitted to screw downward further to firmly secure the regulating valve 5 in the control chamber 43 of the casing 4 according to the wearing of the teflon washer 6. However, once the clearance D is reduced to zero, a new teflon washer must be used.

I claim:

1. A water flow regulating device, comprising:

a casing having a water inlet at one end, a water outlet at an opposite end, a cylindrical control chamber at the upper middle, and a division wall at the lower middle right beneath said cylindrical control chamber to block up said water outlet from said water inlet, said cylindrical control chamber having an outer thread, an inner thread a notch internally at the top and two through-holes on its bottom at two locations respectively in communication with said water inlet and said water outlet;

a regulating valve received in said cylindrical control chamber, having a hand-hold extending from a raised portion at the top of a hollow cylindrical body, said raised portion having a sector notch at its periphery, said hand-hold being disposed out of said casing for holding of the hand, said hollow cylindrical body having two through-holes at its bottom at two locations corresponding to the through-holes on said contorl chamber;

a rubber ring mounted on said raised portion of said regulating valve to protect against leakage of water;

a control ring mounted on said raised portion of said regulating valve above said rubber ring, having an outer projection set in the notch on the top edge of said control chamber and an inner projection inserted in said sector notch of said raised portion for confining the moving range of said regulating valve in said control chamber;

a teflon washer squeezed in between said regulating valve and said control chamber, having two through-holes at two locations corresponding to the through-holes on said regulating valve and the through-holes on said control chamber;

a lock nut screwed up with said inner thread of said casing to secure said control ring, said rubber ring, said regulating valve and said washer in said control chamber; and a nut screwed up with said outer thread of said casing to cover all elements;

characterized in a suitable clearance is maintained between said outer projection of said control ring and the bottom edge of the notch on said control chamber after said washer having been tightly squeezed in between said regulating valve and said control chamber so that the regulating valve can be further squeezed downward by the lock nut according to the wearing of the teflon washer in service.

* * * * *